United States Patent [19]

Goldhofer

[11] 3,954,285
[45] May 4, 1976

[54] VEHICLE WITH A TRACTOR AND A TRAILER

[76] Inventor: Alois Goldhofer, Siechenreuteweg 22, 8941 Amendingen, Germany

[22] Filed: Nov. 12, 1973

[21] Appl. No.: 414,666

[30] Foreign Application Priority Data

July 24, 1973 Germany............................. 2337594

[52] U.S. Cl.......................... 280/405 R; 280/423 R
[51] Int. Cl.²......................................... B62D 53/08
[58] Field of Search ........ 280/405 R, 406 R, 423 B, 280/423 R

[56] References Cited
UNITED STATES PATENTS

| | | | |
|---|---|---|---|
| 2,382,449 | 8/1945 | Simmons......................... | 280/405 R |
| 2,772,892 | 12/1956 | Hake et al. ..................... | 280/405 A |
| 3,006,660 | 10/1961 | Merz................................ | 280/406 R |
| 3,429,585 | 2/1969 | Ross................................. | 280/423 B |
| 3,494,632 | 2/1970 | Bostrom......................... | 280/405 A X |
| 3,670,822 | 6/1972 | Reinhardt ..................... | 280/405 R X |

FOREIGN PATENTS OR APPLICATIONS 463,510  4/1937  United Kingdom............. 280/405 A

*Primary Examiner*—Kenneth H. Betts
*Attorney, Agent, or Firm*—Lackenbach, Lilling & Siegel

[57] ABSTRACT

A tractor trailer vehicle embodying an articulated vehicle in which a hydraulic load compensation unit in the form of a particular connecting bridge is provided between the tractor and the trailer vehicle so that trailer loads are transmitted to the tractor without impairment of the maneuverability or road holding properties of the overall vehicle unit.

6 Claims, 4 Drawing Figures

VEHICLE WITH A TRACTOR AND A TRAILER

BACKGROUND AND SUMMARY OF THE INVENTION

The invention relates to a vehicle with a tractor and a heavy load trailer, in particular an articulated vehicle in which an hydraulic load compensation unit is provided between the tractor and trailer vehicle.

The invention is based on the problem of producing a vehicle of the above-mentioned type with which it is possible to transmit trailer loads to the tractor without impairment of maneuverability and in particular road holding properties of the whole vehicle.

For the solution of this problem the invention is characterised in that there is connected to the tractor a connecting bridge which is pivoted along two axes in respect of the tractor, one axis of which is disposed parallel to the transverse axis of the vehicle and the other axis perpendicular to a plane passing through the transverse axis of the vehicle and longitudinal axis of the vehicle and that the connecting bridge is connected to the trailer vehicle via a piston-cylinder arrangement producing a hydraulic load compensation as well as via a pivot connection, the axis of which runs parallel to the transverse axis of the vehicle.

According to the admission of the piston-cylinder arrangement via the connecting bridge which is constructed as a two-armed lever a more or less greater portion of load is transmitted to the tractor. Due to the two axes provided at the connecting place between the connecting bridge and the tractor a full load holding of the tractor and of the trailer vehicle is attained.

If the connection between the tractor and the connecting bridge is effected via a king pin an extremely stable connection is provided which in addition is easily coupled. Additionally to this king pin connection the pivot of which therefore runs perpendicularly to the plane of the vehicle a second pivot again perpendicular thereto must be provided which, for example, is formed on the support plate of the tractor vehicle.

Particularly favorable lifting conditions are obtained when the piston-cylinder arrangement is disposed on the rear end of the connecting bridge. The joint connection between the trailer vehicle and connecting bridge is therefore provided between the piston-cylinder arrangement and the traction side connection and of the connecting bridge.

An important feature of the subject matter of the invention is characterised in that the piston-cylinder arrangement is admitted by the axle load of one of the sets of wheels of the trailer vehicle. The transmission of forces considered, between the trailer vehicle and tractor is effected therefore in dependence on the actual axle load of the set of wheels concerned which generally should be arranged in the area of the trailer side point of contact of the piston-cylinder arrangement.

Any other of the sets of wheels of the trailer vehicle may however also be subjected to the piston-cylinder arrangement. This is always of advantage if the load is distributed unequally on the trailer vehicle. In this case that set of wheels may then be connected to the piston-cylinder arrangement which is most affected by the load.

If on the terrain the traction vehicle does not have the adequate ground holding properties then via an additional switch valve via a motor pump additional pressure can be applied to the piston-cylinder arrangement in order thus to ensure a still higher saddle load whereby an adequate ground holding force for the traction vehicle is obtained. This measure may of course also be effected additionally to the admission via one or several sets of wheels.

BRIEF DESCRIPTION OF THE ACCOMPANYING DRAWINGS

The invention is explained more precisely in the following description with reference to a prepared embodiment from which further important features follow:

FIG. 1a is an enlarged elevation of part of FIG 1;

FIG. 2 shows a section on line A-B of FIG. 1a; and

DESCRIPTION OF THE PREFERRED EMBODIMENT

Figure 1:
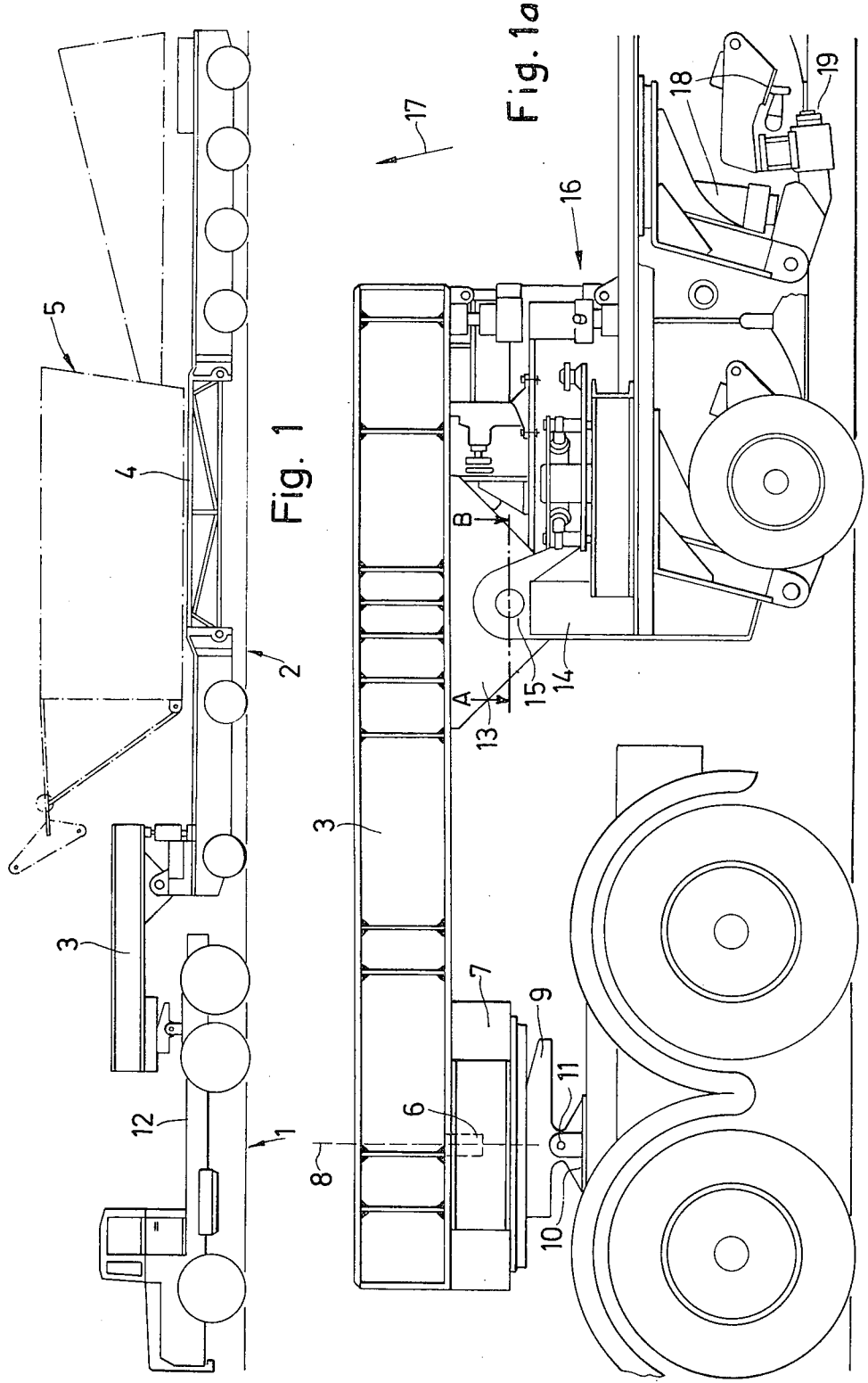
FIG. 1 shows a diagrammatic side view of a vehicle according to the invention.
Figure 2:
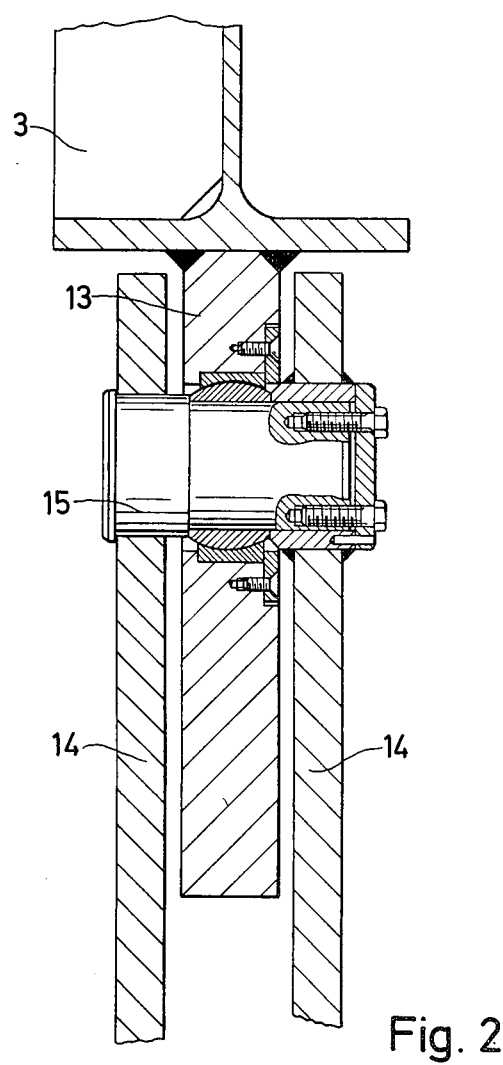

In accordance with the present invention, an articulated tractor is described in FIGS. 1, 1(a) and 2 and comprises a tractor 1 and a multi-axle trailer vehicle 2 pivotally connected to one another by means of a connecting bridge 3. The width of the connecting bridge is generally less than that of the loading area of the trailer vehicle 2.

On the loading area 4 of the trailer vehicle 2 a load is placed which in the embodiment shown consists of a crane 5.

Between the tractor 1 and the connecting bridge 3 a connection is provided which consists of a king pin 6 which engages in a constructional element 7 which is connected to the loading area of the tractor 1. Thus a first axis of rotation 8 is formed which runs through the king pin 6.

The constructional element 7 is located on a plate 9 which is pivotally mounted on a support 10 by a pivot 11. The support 10 is firmly connected to the loading area 12 of the tractor 1.

On the rear end of the connecting bridge 3 and firmly connected to it, are lateral flanges 13 which with frame plates 14 firmly connected to the trailer vehicle 2 form a pivot 15 (FIG. 2).

On the outer end of the connecting bridge 3 there is provided between it and the loading area 4 a piston-cylinder arrangement 16. When pressure is admitted to the cylinder the connecting bridge 3 is pivoted upwards about the pivot 15 in the direction of the arrow 17 so that a corresponding force is transmitted to the tractor vehicle 1.

In order to be able to supply the piston-cylinder arrangement 16 in the manner described it is connected preferably via a hydraulic pipe (not shown) to a hydraulic cylinder 18 the inner pressure of which corresponds to the axle load of its set of wheels 19. Another of the sets of wheels of the trailer vehicles may however also be connected in the manner described to the piston-cylinder arrangement 16. For this there is provided generally the respective greatest loaded axle group. The switching over is then effected by means of a shut off cock which is suitably identified in order to obviate confusion. By the respective greatest loaded axle group, it is meant through the center of gravity of the load, the axle group loaded to the maximum may be ascertained (axle group forward or after). Thus, the piston cylinder arrangement 16 may be joined to the four different axle groups (forward left-hand, forward right-hand, after left-hand, after right-hand) by opening and closing suitable shut-off valves.

The piston-cylinder arrangement may however also be operated by an additional switch valve (suitably of the multi-weight type) via a pressure motor pump in order thus to accommodate a still higher saddle load. Thus put, a suitable ground holding for the saddle tractor is obtained. In this case the compensation cylinder of the arrangement 16 is switched off from the compensation cylinder 18 via a shut off valve.

Figure 3:
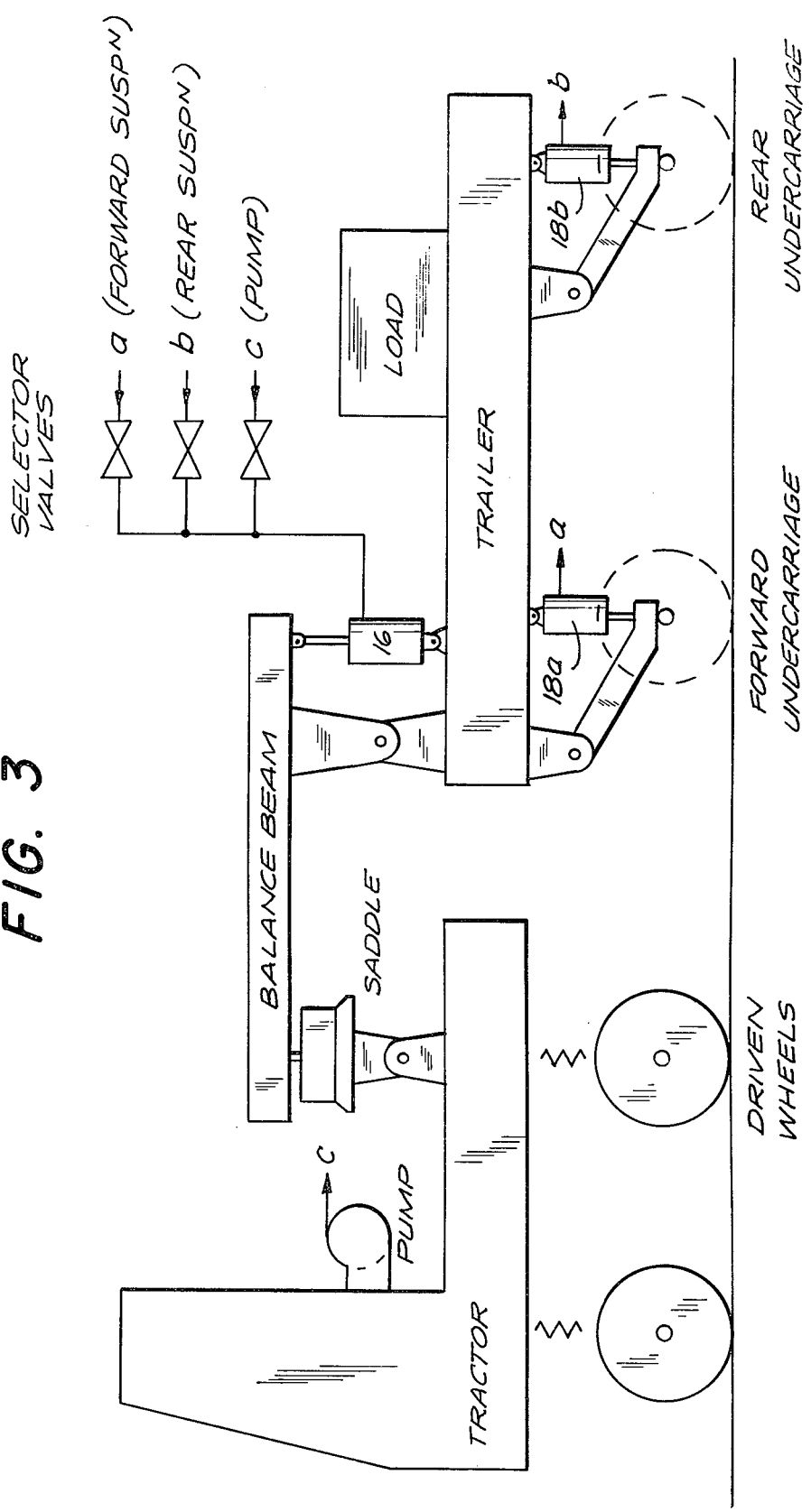
FIG. 3 is a diagrammatic representation of the vehicle as shown in FIGS. 1 and 1a, showing how the hydraulic interconnections are made between each of the under carriages of the trailer and a pump operated from the cabin of the tractor with the hydraulic cylinder arrangement connected to the balance beam.

In FIG. 3 there is shown diagrammatically the tractor trailers shown in FIGS. 1 and 1a to clarify the above-described operation of the present invention. Firstly, it should be noted from all the figures that the present invention is most useful in connection with a trailer which has front and rear sets of wheels or under carriages. This is distinguished from semi-trailers which typically do not have forward under carriages but the frontal portions of the trailers are fully supported by the tractor. The center of gravity of a load placed on the trailer is normally closer to the forward under carriage which may have four axles, although only two are shown in FIG. 1. The rear under carriage may have, for example, three axles although four are shown in FIG. 1. In FIG. 3, on the other hand, all the wheels of the forward under carriage are represented by one axle and the same is true for the rear under carriage. It will be noted in FIG. 3 that the forward under carriage has associated with it a forward hydraulic cylinder 18A having an outlet conduit (a). Similarly, the axle of the rear under carriage is connected to the trailer by means of a hydraulic cylinder 18B which has associated therewith an outlet conduit (b). The hydraulic pressure in each of the outlet conduits (a) and (b) is determined or is a function of the pressure within the respective hydraulic cylinders and, in turn, upon the loads which are applied to the respective axles of the associated under carriages. A pump is mounted on the tractor which has an outlet conduit (c) and which may be actuated by the operator of the tractor trailer to control the fluid pressure within the outlet conduit (c).

Each of the outlet conduits (a), (b) and (c) are connected by means of selector valves to the piston-cylinder arrangement 16 which is connected to the balance beam or connecting bridge 3 as abovedescribed. It will be appreciated that with this arrangement the input to the piston-cylinder arrangement 16 may be selected from a plurality of outputs, namely the outputs from each of the hydraulic cylinders associated with one of the under carriage or a separately actuatable pump. Once the load is placed on the trailer, the loads on the axles of the forward and rear under carriages is monitored and the maximum load on these axles is established. By adjusting these selector valves, the maximum axle load which has been monitored can be translated into hydraulic pressure by means of the respective hydraulic cylinders 18A and 18B which pressure is fed to the piston-cylinder arrangement 16 for compensating or equalizing the loads on the several axles. Alternately, the pump (c) may be actuated when the loads are to be distributed on the various axles in a desired manner independently of the maximum load distributions on the under carriages. Thus, while each of the axles may be initially subjected to different loads, the hydraulic arrangement which includes the axle load monitoring hydraulic cylinders 18A and 18B permits the application of hydraulic pressure to the piston-cylinder arrangement 16 which corresponds to a maximum axle load which is applied to any one of the trailer axles. Also, in this manner, the piston-cylinder arrangement 16 is responsive to the maximum loading of the axles of the sets of wheels of the trailer.

The arrangement 16 via the axle load of the sets of wheels thus always provides the same pressures and thus the same forces in the direction of the arrow 17 are ensured corresponding to the respective state of loading. By means of the arrangement described furthermore the axle load on the trailer is reduced and transmitted to the saddle tractor. Unevenness between the saddle tractor and heavy load trailer can be compensated via the axle 15 and the arrangement 16. The operating pressure in the cylinder unit 18 is increased corresponding to the useful load applied and is transmitted uniformly on the arrangement 16 so that a corresponding saddle load independent of the load results.

The location of the pivot 15 and of the piston-cylinder arrangement 16 may also be unchanged for one another. In this case the arrangement must also be so controlled that a force is exercised in the opposite direction to the arrow 17.

With the apparatus described the useful load of the trailer may be increased since a portion of the useful load is transmitted to the saddle tractor. With conventional trailers a normal heavy load lorry is used which must have a suitable ballast box with ballast. This weight however is useless for the material to be transported. These drawbacks are overcome by the apparatus according to the invention.

Accordingly, it will be appreciated that the invention achieves substantially ground contact of the wheels together with a full sharing of the load.

The apparatus described may always be applied advantageously when two or more membered vehicles are to be loaded. The number of axles of the trailer vehicle are of subordinate significance.

Although the present invention has been described in some detail by way of illustration and example for purposes of clarity of understanding, it will, of course, be understood that various changes and modifications may be made in the form, details, and arrangement of the parts without departing from the scope of the invention as set forth in the claims.

What is claimed is:

1. A vehicle such as a tractor-trailer unit having a longitudinal axis and wherein the trailer has a plurality of axles having sets of wheels, each of which axles may be subjected to different loads, comprising: an articulated means pivotally coupled to the tractor or tow vehicle and having a hydraulic load compensation or equalizing device; said means being disposed between said tractor and said trailer vehicle and comprising a connecting bridge pivotally connected to said tractor along a first axis perpendicular to the longitudinal axis of said vehicle; said bridge being further pivotably connected to said tractor about a second axis oriented perpendicularly with respect to said first axis; and said bridge being pivotally connected to said trailer along an axis parallel to said second axis; said device comprising at least one hydraulic piston-cylinder arrangement, pivotably connected to said bridge and said trailer; and means for applying hydraulic pressure to said piston-cylinder arrangement which corresponds to the maximum load applied to any one of said plurality of axles to provide a desired saddle load and adequate ground holding force of the tractor vehicle may be controllably established: whereby said piston-cylinder arrangement is responsive to the maximum loading of said axles of said sets of wheels.

2. The vehicle according to claim 1, wherein said arrangement is responsive to the loading of at least the set of wheels disposed in the area of the trailer side adjacent the point of contact of the piston-cylinder arrangement for said trailer.

3. The vehicle according to claim 1, wherein the piston-cylinder arrangement is disposed near the rear end of the connecting bridge and the force exerted by said piston-cylinder arrangement being directed upwardly about said axis tending to space further apart said rear end of said bridge from said trailer.

4. The vehicle according to claim 1, wherein the piston-cylinder arrangement is disposed forward of said axis connecting said bridge to said trailer, and the force exerted by said piston-cylinder arrangement being directed downwardly toward said ground about said axis tending to space further apart said rear end of said bridge from said trailer.

5. The vehicle according to claim 1, wherein said pivotal axis connecting said bridge to said trailer is in the form of a king-pin type of pivotal connection.

6. The vehicle according to claim 1, wherein said means for applying hydraulic pressure to said piston-cylinder arrangement further includes a separate pressure motor pump and valve means for applying additional pressure to said piston-cylinder arrangement, thereby generating higher saddle loads.

* * * * *